United States Patent
Chiu

(10) Patent No.: US 8,200,993 B2
(45) Date of Patent: *Jun. 12, 2012

(54) METHOD FOR ACTIVATING A COMPUTER SYSTEM IN A LOW TEMPERATURE ENVIRONMENT

(75) Inventor: Chia-Chang Chiu, Hsinchu (TW)

(73) Assignee: Mitac Technology Corp., Hinshu (TW)

( * ) Notice: Subject to any disclaimer, the term of this patent is extended or adjusted under 35 U.S.C. 154(b) by 769 days.

This patent is subject to a terminal disclaimer.

(21) Appl. No.: 12/247,079

(22) Filed: Oct. 7, 2008

(65) Prior Publication Data

US 2010/0070746 A1    Mar. 18, 2010

Related U.S. Application Data

(63) Continuation-in-part of application No. 12/233,391, filed on Sep. 18, 2008.

(51) Int. Cl.
*G06F 1/00* (2006.01)
(52) U.S. Cl. ....... 713/300
(58) Field of Classification Search .......... 713/300
See application file for complete search history.

(56) References Cited

U.S. PATENT DOCUMENTS

| | | | | |
|---|---|---|---|---|
| 4,967,155 A * | 10/1990 | Magnuson | | 324/212 |
| 5,637,982 A * | 6/1997 | Nanno et al. | | 320/150 |
| 6,169,930 B1 * | 1/2001 | Blachek et al. | | 700/79 |
| 7,135,838 B2 * | 11/2006 | Young et al. | | 320/134 |
| 7,523,338 B2 * | 4/2009 | Fu et al. | | 713/340 |
| 2003/0081934 A1 * | 5/2003 | Kirmuss | | 386/46 |
| 2003/0099055 A1 * | 5/2003 | Kim et al. | | 360/69 |
| 2004/0105488 A1 * | 6/2004 | Felder | | 374/170 |
| 2004/0143686 A1 * | 7/2004 | Morita et al. | | 710/1 |
| 2007/0146923 A1 * | 6/2007 | Imai et al. | | 360/69 |

* cited by examiner

*Primary Examiner* — Mohammed Rehman
(74) *Attorney, Agent, or Firm* — Apex Juris, pllc; Tracy M. Heims

(57) ABSTRACT

A method for booting a computer device under a low temperature state is provided. A trigger signal is detected when a power button is pressed. A hard disk temperature of a hard disk is obtained via a temperature sensor to determine whether the hard disk temperature is less than a first predetermined temperature. If so, a heater is activated to heat the hard disk until the hard disk temperature is greater than the first predetermined temperature. If the hard disk temperature is greater than the first predetermined temperature, the heater is turned off and afterwards a voltage of a battery cell is checked if the voltage has reached a predetermined voltage. If the voltage of the battery cell has reached the predetermined voltage, a system component of a computer device is activated.

20 Claims, 3 Drawing Sheets

METHOD FOR ACTIVATING A COMPUTER SYSTEM IN A LOW TEMPERATURE ENVIRONMENT

CROSS REFERENCE

This application is a continuation-in-part application of U.S. application Ser. No. 12/233,391 filed on Sep. 18, 2008, the entirety of which is incorporated by reference herein.

BACKGROUND OF THE INVENTION

1. Field of the Invention

The invention relates to a computer device, and more particularly to a computer device and method for booting under a low temperature state.

2. Description of the Related Art

Under a low temperature environment, a computer device (such as a notebook) usually cannot be normally activated, as discharge amount of a battery cell of the computer device under the low temperature environment is different from that under an atmospheric temperature environment.

One solution is to heat the hard disk with a heater to allow the hard disk to reach a booting temperature. However, when a battery is at a low temperature state, amount of power of the battery is insufficient, or voltage of the battery can not reach a booting voltage. Thus, it may not be possible to activate a system component if a heater is activated to heat the hard disk.

SUMMARY OF THE INVENTION

Methods for booting under a low temperature state are provided. An exemplary embodiment of a method for booting under a low temperature state comprises the following. A power button is detected to have been pressed according to a trigger signal and a hard disk temperature of a hard disk is obtained via a temperature sensor to determine whether the hard disk temperature is less than a first predetermined temperature. If the hard disk temperature is less than the first predetermined temperature, a heater is activated to heat the hard disk and the hard disk temperature is obtained via the temperature sensor to determine whether the hard disk temperature is greater than the first predetermined temperature. If the hard disk temperature is greater than the first predetermined temperature, the heater is turned off and it is determined whether a voltage of a battery cell has reached a predetermined voltage. If the voltage of the battery cell has reached the predetermined voltage, a system component of a computer device is activated.

Computer devices are provided. An exemplary embodiment of a computer device comprises a power button, a hard disk, a battery cell, a first temperature sensor, and an embedded controller. The hard disk is installed with a heater and a second temperature sensor. The heater is activated to heat the hard disk, when the second temperature sensor detects a hard disk temperature less than a first predetermined temperature, and is turned off when the second temperature sensor detects a hard disk temperature greater than the first predetermined temperature. The first temperature sensor obtains a battery temperature of the battery cell. The embedded controller detects whether the power button has been pressed according to a trigger signal, and if so, determines whether a voltage of the battery cell has reached a predetermined voltage when the hard disk temperature is greater than the first predetermined temperature and the heater has been turned off, and activates a system component of the computer device when the predetermined voltage has been reached.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
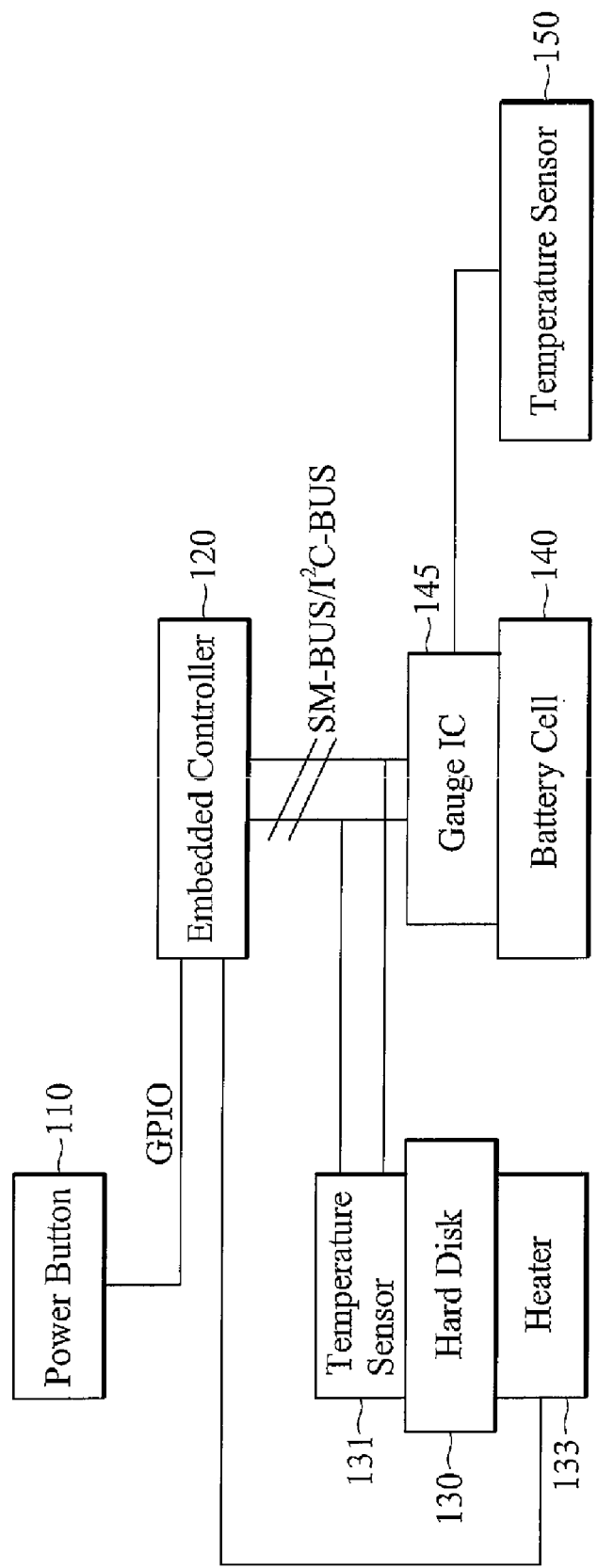
FIG. 1 is a schematic view of a computer device of the present invention.

Several exemplary embodiments of the invention are described with reference to FIGS. 1 through 2, which generally relate to booting under a low temperature state. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a method for booting under a low temperature state and computer device using the same.

FIG. 1 is a schematic view of a computer device of the present invention.

An exemplary embodiment of a computer device at least comprises a power button 110, an embedded controller 120 (keyboard controller (KBC)), a hard disk 130, a battery cell 140, and a temperature sensor 150. The hard disk 130 is installed with a temperature sensor 131 and a heater 133 while the battery cell has a gauge integrated circuit (IC) 145.

The described components are mutually connected via a General Purpose Input/Output (GPIO) and System Management Bus (SM-BUS)/Inter-Integrated Circuit Bus ($I^2C$-BUS).

The embedded controller 120 detects whether the power button 110 has been pressed according to a trigger signal, and if so, obtains a hard disk temperature from the hard disk 130 via the temperature sensor 131, and determines whether the hard disk temperature is less than a first predetermined temperature (5° C., for example, i.e. an allowable temperature for power supply and activation of the computer device). If the hard disk temperature is not less than the first predetermined temperature (i.e. equal to or greater than 5° C.), the embedded controller 120 determines whether a voltage of the battery cell 140 has reached a predetermined voltage (10.2V, for example, i.e. a preset booting voltage). If the voltage of the battery cell 140 has reached the predetermined voltage, the embedded controller 120 activates a system component of the computer device, or does not activate the system component of the computer device. In the present invention, a system component is defined as an electrical component or a hardware module that is essential for a normal operation of the computer device.

If the hard disk temperature is less than the first predetermined temperature, the embedded controller 120 obtains a battery temperature from the battery cell 140 via the temperature sensor 150 connecting to the gauge IC 145 and determines whether the battery temperature is less than a second predetermined temperature (−5° C., for example). If the battery temperature is less than the second predetermined temperature, the embedded controller 120 determines whether the amount of power of the battery cell 140 is greater than a predetermined value (50% or 80% of the total amount, for example) via the gauge IC 145. If the amount of power of the battery cell 140 is not greater than the predetermined value, the embedded controller 120 does not activate the system component.

If the amount of power of the battery cell 140 is greater than the predetermined value, the embedded controller 120 determines whether the amount of power of the battery cell 140 has reached the predetermined value. If the amount of power of the battery cell 140 has not reaching whether the predetermined value, the embedded controller 120 does not activate the system component. If the amount of power of the battery cell 140 has reached the predetermined value, the embedded controller 120 activates the heater 133 of the hard disk 130 to heat the hard disk 130. The embedded controller 120 obtains the hard disk temperature from the hard disk 130 via the temperature 131 and determines whether the hard disk temperature is greater than the first predetermined temperature (5° C., for example).

If the hard disk temperature is not greater than the first predetermined temperature, the heater 133 continuously heats the hard disk 130. If the hard disk temperature is greater than the first predetermined temperature, the embedded controller 120 turns off the heater 133 and determines whether the voltage of the battery cell 140 has reached the predetermined voltage (10.2V, for example) via the gauge IC 145. If the voltage of the battery cell 140 has reached the predetermined voltage, the embedded controller 120 activates the system component, and, if not, inactivates the system component.

Figure 2A:
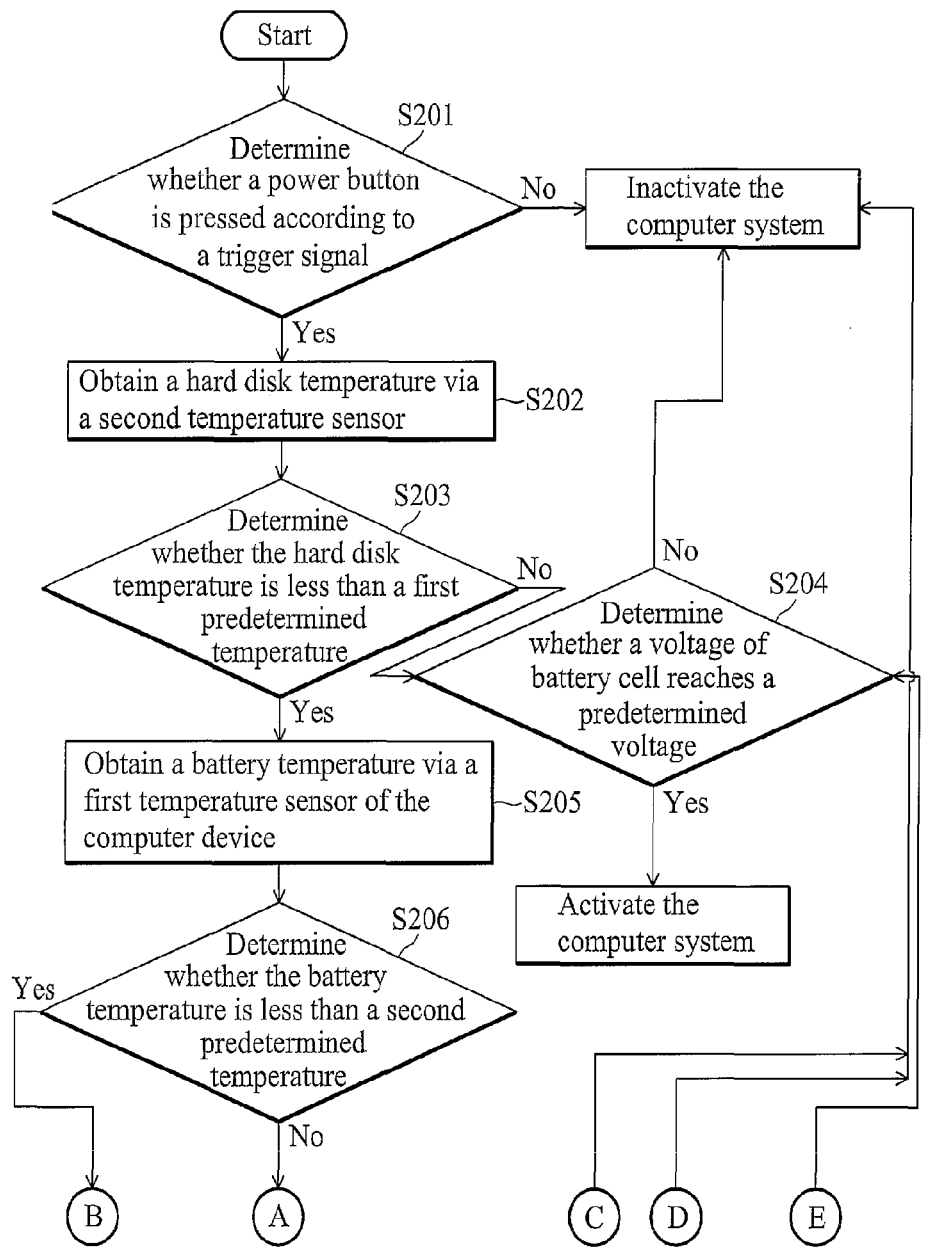
FIG. 2 is a flowchart of a method for booting under a low temperature state of the present invention.
Figure 2B:
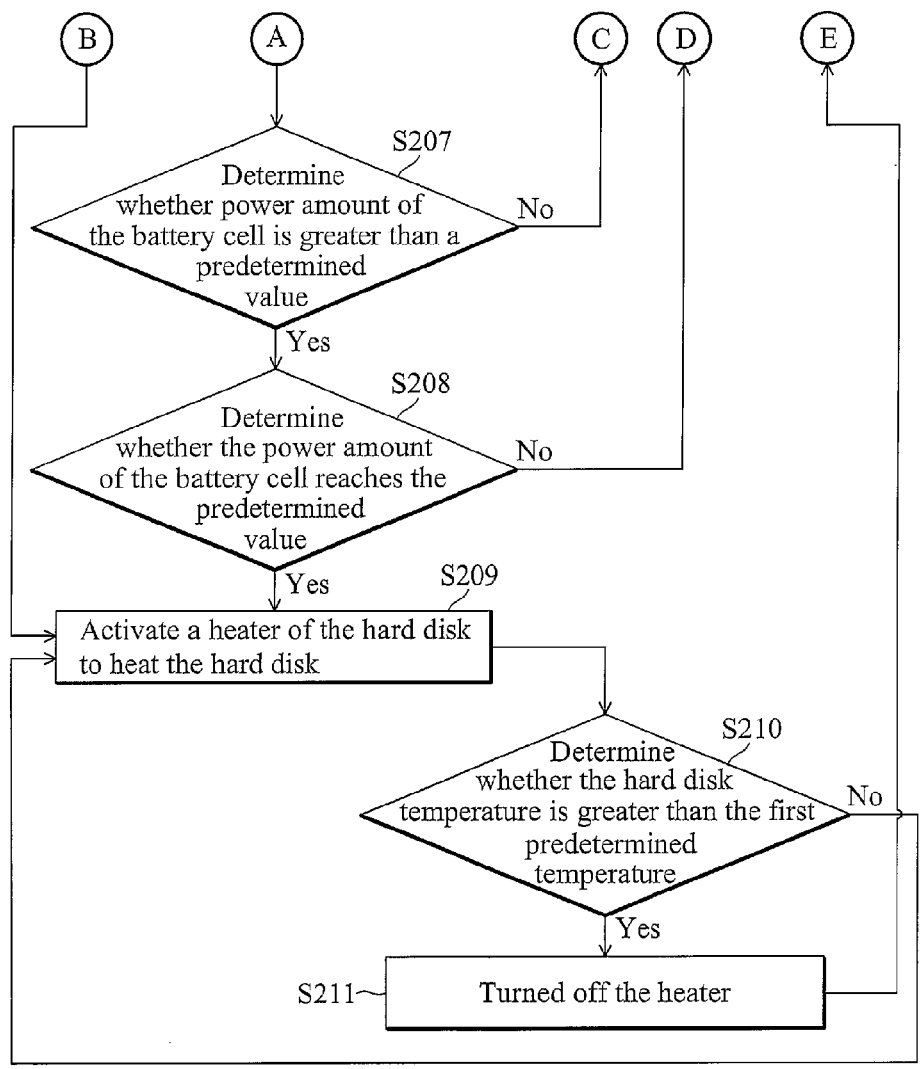

FIG. 2 is a flowchart of a method for booting under a low temperature state of the present invention.

It is determined whether a power button of a computer device has been pressed according to a trigger signal (step S201). If so, a hard disk temperature is obtained from a hard disk of the computer device via a second temperature sensor of the computer device (step S202). Next, it is determined whether the hard disk temperature is less than a first predetermined temperature (5° C., for example, i.e. an allowable temperature for power supply and activation of the computer device) (step S203). If the hard disk temperature is not less than the first predetermined temperature (i.e. equal to or greater than 5° C.), it is determined whether a voltage of battery cell of the computer device has reached a predetermined voltage (10.2V, for example, i.e. a preset booting voltage) (step S204). If the voltage of the battery cell of the computer device has reached the predetermined voltage, a system component of the computer device is activated.

If the hard disk temperature is less than the first predetermined temperature, a battery temperature is obtained from the battery cell via a first temperature sensor connected to a gauge IC of the computer device (step S205) and it is determined whether the battery temperature is less than a second predetermined temperature (−5° C., for example) (step S206). If the battery temperature is less than the second predetermined temperature, it is determined whether the amount of power of the battery cell is greater than a predetermined value (50% or 80% of the total amount, for example) via the gauge IC (step S207). If the amount of power of the battery cell is not greater than the predetermined value, the system component is not activated.

If the amount of power of the battery cell is greater than the predetermined value, it is determined whether the amount of power of the battery cell has reached the predetermined value (step S208). If the amount of power of the battery cell has not reached the predetermined value, the system component is not activated. If the amount of power of the battery cell has reached the predetermined value, a heater of the hard disk is activated to heat the hard disk (step S209). The hard disk temperature is obtained from the hard disk via the second temperature and it is determined whether the hard disk temperature is greater than the first predetermined temperature (5° C., for example) (step S210).

If the hard disk temperature is not greater than the first predetermined temperature, the heater continuously heats the hard disk. If the hard disk temperature is greater than the first predetermined temperature, the heater is turned off (step S211) and it is determined whether the voltage of the battery cell has reached the predetermined voltage (10.2V, for example) via the gauge IC (step S204). If the voltage of the battery cell has reached the predetermined voltage, the system component is activated.

It is noted that, in this embodiment, the boot temperature (5° C.), the battery temperature (−5° C.), the booting voltage (10.2V), and the power amount (50% or 80%) are only examples and are not limited thereto.

An embodiment of a method for booting under a low temperature state detects the temperature of the hard disk via the keyboard and determines whether the voltage and amount of power of the battery cell correspond to a booting condition under a low temperature state. If corresponding to the booting condition, the keyboard controller activates the heater to heat the hard disk, enabling the hard disk to reach the booting temperature, so that the system component of computer device can be activated.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for booting a computer device under a low temperature state, comprising:
   detecting a trigger signal to determine whether a power button of the computer device is pressed;
   obtaining a hard disk temperature via a second temperature sensor of a hard disk of the computer device, if the power button is pressed;

determining whether the hard disk temperature is less than a first predetermined temperature;

if the hard disk temperature is less than the first predetermined temperature, activating a heater of the hard disk to heat the hard disk;

determining whether the hard disk temperature is greater than a first predetermined temperature via the second temperature sensor;

if the hard disk temperature is greater than the first predetermined temperature, turning the heater off and determining whether a voltage of a battery cell of the computer device reached a predetermined voltage;

if voltage of a battery cell of the computer device has reached a predetermined voltage, activating a system component of the computer device;

if the hard disk temperature is less than the first predetermined temperature, obtaining a battery temperature of the battery cell via a first temperature sensor of the computer device; and determining whether the battery temperature is less than a second predetermined temperature.

2. The method of claim 1, further comprising:
if the battery temperature is less than a second predetermined temperature, determining whether the amount of power of the battery cell is greater than a preset value; and
if the amount of power of the battery cell is not greater than a preset value, inactivating the system component.

3. The method of claim 2, further comprising:
if the amount of power of the battery cell is greater than the preset value, determining whether the voltage of the battery cell has reached the predetermined voltage; and
if the voltage of the battery cell has not reached the predetermined voltage, inactivating the system component.

4. The method of claim 3, further comprising:
if the voltage of the battery cell has reached the predetermined voltage, activating whether the heater to heat the hard disk;
obtaining whether the hard disk temperature via the second temperature sensor; determining whether the hard disk temperature is greater than the first predetermined temperature; and
if the hard disk temperature is not greater than the first predetermined temperature, continuously heating whether the hard disk via the heater.

5. The method of claim 4, further comprising:
if the hard disk temperature is greater than the first predetermined temperature, turning whether the heater off;
determining whether the voltage of the battery cell has reached the predetermined voltage; and
if the voltage of the battery cell has reached the predetermined voltage, activating whether the system component.

6. The method of claim 2, further comprising activating whether the heater to heat the hard disk if the battery temperature is not less than the second predetermined temperature.

7. The method of claim 2, wherein the second predetermined temperature is −5° C.

8. The method of claim 1, further comprising continuously heating whether the hard disk via the heater if the hard disk temperature is not greater than the first predetermined temperature.

9. The method of claim 1, further comprising:
if the hard disk temperature is not less than the first predetermined temperature, determining whether the voltage of the battery cell has reached the predetermined voltage; and
if voltage of the battery cell has reached the predetermined voltage, activating whether the system component.

10. The method of claim 1, wherein the first predetermined temperature is 5° C. and the predetermined voltage is 10.2V.

11. A computer device, comprising:
a power button;
a hard disk, installed with a heater and a second temperature sensor, wherein the heater is activated to heat the hard disk when the second temperature sensor detects a hard disk temperature less than a first predetermined temperature and is turned off when the second temperature sensor detects a hard disk temperature greater than the first predetermined temperature;
a battery cell;
a first temperature sensor, obtaining a battery temperature of the battery cell; and
an embedded controller, detecting whether the power button has been pressed according to a trigger signal, and if so, determining whether a voltage of the battery cell has reached a predetermined voltage when the hard disk temperature is greater than the first predetermined temperature and the heater has been turned off, and activating a system component of the computer device when a voltage of the battery cell has reached a predetermined voltage; and
if the hard disk temperature is less than the first predetermined temperature, the embedded controller obtains a battery temperature of the battery cell via the first temperature sensor and determines whether the battery temperature is less than a second predetermined temperature.

12. The computer device of claim 11, wherein:
if the battery temperature is less than the second predetermined temperature, the embedded controller determines whether the amount of power of the battery cell is greater than a preset value; and
if the amount of power of the battery cell is not greater than the preset value, the embedded controller inactivates the system component.

13. The computer device of claim 12, wherein:
if the amount of power of the battery cell is greater than the preset value, the embedded controller determines whether the voltage of the battery cell has reached the predetermined voltage; and
if the voltage of the battery cell has reached the predetermined voltage, the embedded controller inactivates the system component.

14. The computer device of claim 13, wherein:
if the voltage of the battery cell has reached the predetermined voltage, the embedded controller activates the heater to heat the hard disk;
the embedded controller obtains the hard disk temperature via the second temperature sensor and determines whether the hard disk temperature is greater than the first predetermined temperature; and
if the hard disk temperature is not greater than the first predetermined temperature, the embedded controller continuously heats the hard disk via the heater.

15. The computer device of claim 14, wherein:
if the hard disk temperature is greater than the first predetermined temperature, the embedded controller turns the heater off and determines whether the voltage of the battery cell has reached the predetermined voltage; and if the voltage of the battery cell has reached the predetermined voltage, the embedded controller activates the system component.

16. The computer device of claim 12, wherein the embedded controller activates the heater to heat the hard disk if the battery temperature is not less than the second predetermined temperature.

17. The computer device of claim 12, wherein the second predetermined temperature is −5° C.

18. The computer device of claim 11, wherein the embedded controller continuously heats the hard disk via the heater if the hard disk temperature is not greater than the first predetermined temperature.

19. The computer device of claim 11, wherein:

if the hard disk temperature is not less than the first predetermined temperature, the embedded controller determines whether the voltage of the battery cell has reached the predetermined voltage; and if the voltage of the battery cell has reached the predetermined voltage, the embedded controller activates the system component.

20. The computer device of claim 11, wherein the first predetermined temperature is −5° C. and the predetermined voltage is 10.2V.

* * * * *